Figure 1:
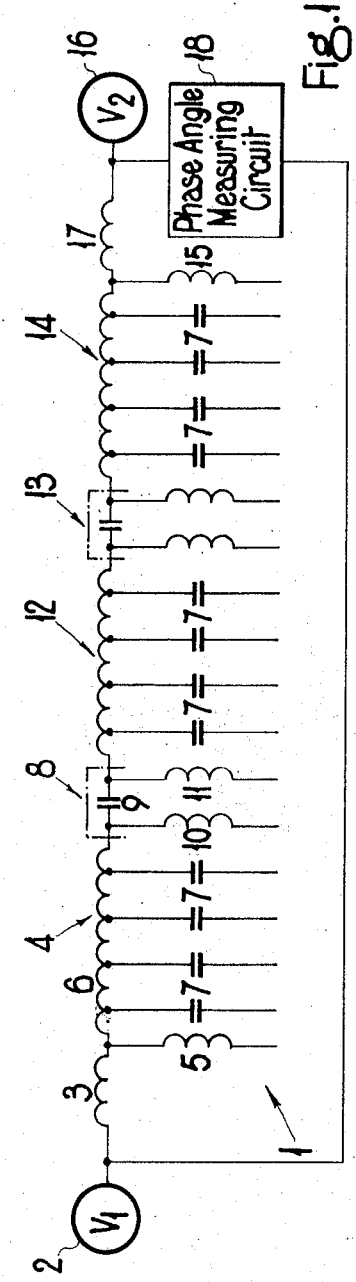

United States Patent [19]
Friedlander

[11] 3,792,288
[45] Feb. 12, 1974

[54] A. C. POWER TRANSMISSION SYSTEMS

[75] Inventor: Erich Siegfried Friedlander, Sutton Coldfield, England

[73] Assignee: Associated Electrical Industries Limited, London, England

[22] Filed: Aug. 9, 1972

[21] Appl. No.: 278,927

[52] U.S. Cl. .................... 307/102, 323/89, 323/124
[51] Int. Cl. ............................................. H02j 3/24
[58] Field of Search 307/102; 323/127, 89, 90, 102, 323/105, 121, 122, 124, 125, 126, 129

[56] References Cited
UNITED STATES PATENTS

| | | |
|---|---|---|
| 3,611,040 | 10/1971 | Ainsworth .................... 307/102 X |
| 2,470,454 | 5/1949 | Alexanderson .................... 307/102 |
| 2,348,026 | 5/1944 | Peterson .......................... 307/102 |

Primary Examiner—Robert K. Schaefer
Assistant Examiner—William J. Smith
Attorney, Agent, or Firm—Morris Kirschstein et al.

[57] ABSTRACT

An alternating current power transmission system having a transmission line and at least one saturated reactor connected in shunt with the transmission line, in which there are provided control means for controlling the current voltage characteristic of the reactor to give a positive damping of oscillations induced in the system as a result of a disturbance occurring in the system.

5 Claims, 5 Drawing Figures

A. C. POWER TRANSMISSION SYSTEMS

This invention relates to a.c. power transmission systems employing transmission lines, and to methods of operating such systems.

If an a.c. power transmission system employing a transmission line is subjected to a disturbance, resulting either from an external influence or from a natural tendency of the system to undergo self excited oscillations, the system will swing about an equilibrium condition. In a theoretical, loss-free system the oscillations would continue for a very long period. In practice, the losses in the system provide some damping of the oscillations, but further damping is necessary to ensure that the equilibrium condition is reached in the shortest possible time after the disturbance occurs. The following discussion explains why the inherent damping of the system may be insufficient or may even become negative under some circumstances.

Consider the simple power transmission equation $$P = (V_1 \cdot V_2/Z) \cdot \sin \theta \qquad (1)$$

where
- $P$ is the transmitted power
- $V_1$ is the voltage at the sending end of the transmission line
- $V_2$ is the voltage at the receiving end of the transmission line
- $\theta$ is the phase angle between $V_1$ and $V_2$
- $Z$ is a factor of proportionality dependent upon the transmission line characteristics.

For an ideally stabilized line in which a substantially constant voltage approximately equal to $V_1$ and $V_2$ is maintained all along the line, equation (1) becomes $$P = (V_1 \cdot V_2/Z) \cdot \theta \qquad (2)$$

If the components of equation (1) or equation (2) are frequency-dependent, there will be a change in transmitted power with rate of change of phase angle. Such changes in power will automatically occur because a change of phase angle produces an effective temporary change of frequency relative to any point in the system at which the voltage vector could be assumed to rotate at absolutely constant frequency.

Consider a system in which, for example, $V_1$ represents a generator and $V_2$ represents a motor, both generator and motor having the same mass. If a sudden reduction in transmitted power occurs due, for example, to the loss of use of one of a pair of parallel transmission line sections, neither the transmitted power nor the absorbed power will change instantaneously. Hence, the generator will accelerate and the motor will decelerate.

The voltage at the midpoint of the line between the generator and the motor will remain at a substantially constant level. Hence, if $V_2$ decreases but $V_1$ increases with increasing phase angle $\theta$, there will be no resultant change in the transmitted power and the frequency dependence of $V_1$ and $V_2$ will not affect the damping of the system.

If, on the other hand, $V_2$ represents a network with a very great inert mass, whereas $V_1$ represents a generating station supplying only the power over the transmission line to $V_2$ and having a relatively very small mass, then $V_1$, increasing with positive rate of change of $\theta$ ($d\theta/dt$) will contribute to positive damping of the system.

In a third case, in which $V_2$ represents, for example, a pumping station motor having a low mass, whilst $V_1$ represents a large supply system having a very large mass, the power increases with negative $d\theta$ and the system can become unstable (ignoring other variables of the system).

The voltages $V_1$ and $V_2$ are not the only parameters in the system which are responsive to frequency variations. The reactances of the network are also frequency-dependent, and in consequence could cause added positive or negative damping.

In known methods of exerting a stabilizing influence against underdamped or even negatively damped oscillations, either or both of the voltages $V_1$ and $V_2$ are subjected to control in dependence upon the rate of change of $\theta$. Alternatively, excess power has been absorbed by means of variable loads such as switched resistors or controlled rectifier loads, or power has been fed by invertors into the transmission system.

It is an object of the present invention to provide an improved method of controlling the damping of oscillations on an a.c. power transmission system.

According to one aspect of the invention, an alternating current power transmission system including a transmission line wherein at least one saturated reactor is connected in shunt with the transmission line and means are provided for controlling the current voltage characteristic of the reactor to give a positive damping of oscillations induced in the system as a result of a disturbance occurring in the system.

Said control means is preferably operative to control the current voltage characteristic of the reactor in such a manner that the voltage at the point of connection of the reactor to the transmission line varies with the rate of change of line current.

The transmission line may include in addition, series and/or shunt impedance elements, at least some of which are varied by said means.

The voltage at the point of connection of the saturated reactor may be made greater while the line current is rising or vice versa.

Figure 2:
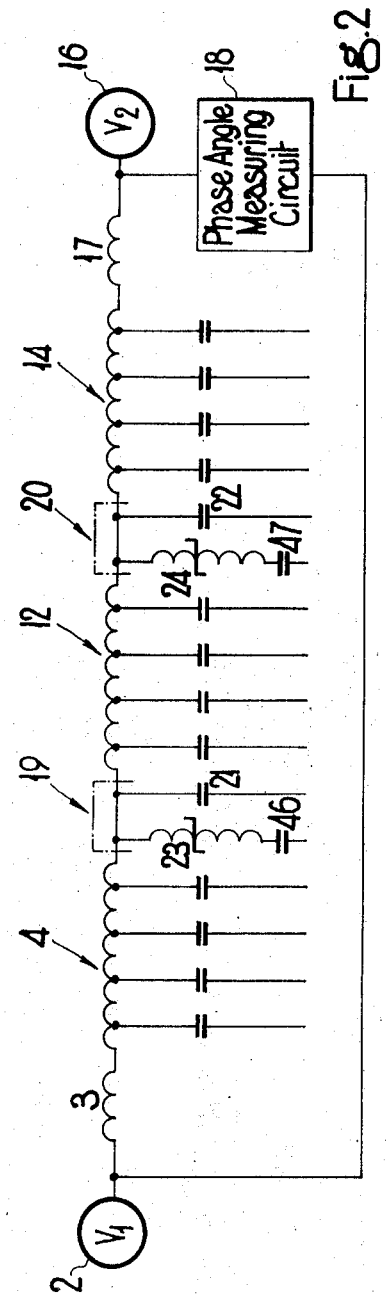
Figure 3:
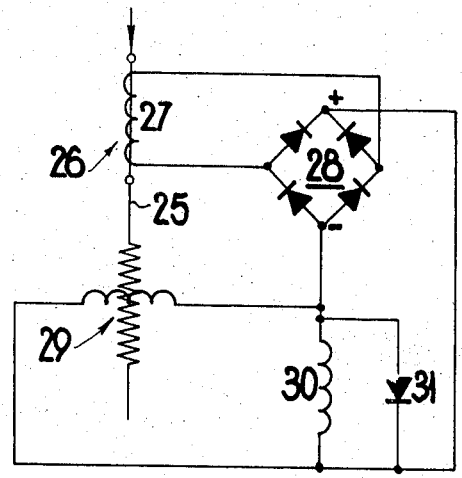
Figure 4:
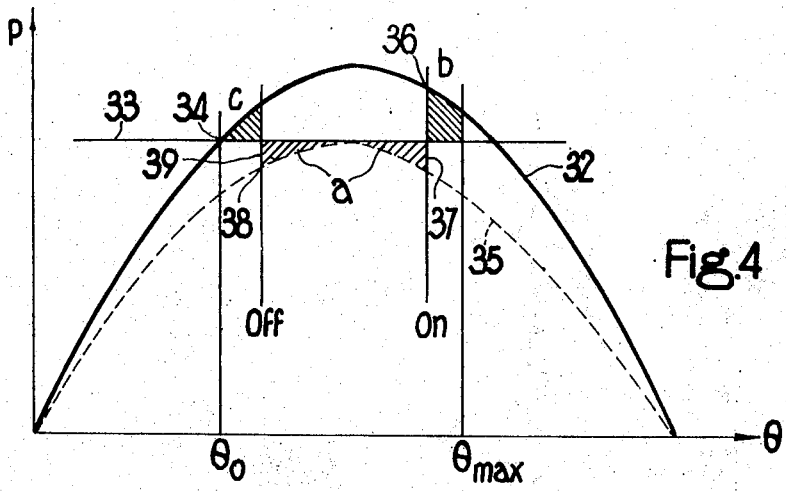
Figure 5:
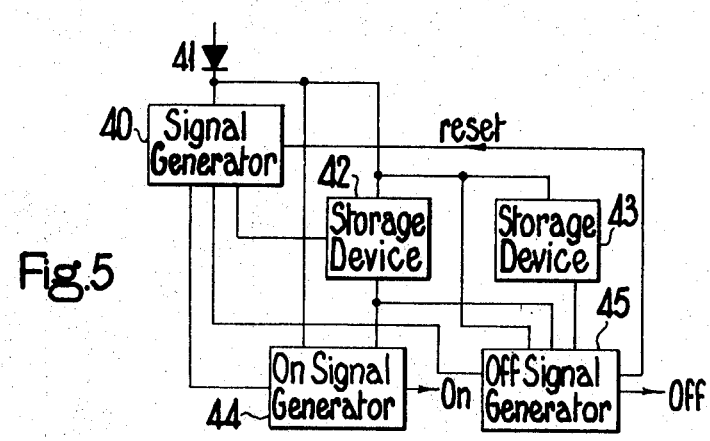

A number of different embodiments of the invention will now be described, by way of example, with reference to FIGS. 1 to 5 of the accompanying drawings, in which:

FIGS. 1 and 2 are schematic diagrams of a.c. transmission systems in which FIG. 1 illustrates a known system capable of being provided with a form of damping control in accordance with the invention, FIG. 2 is a schematic diagram of an a.c. transmission system incorporating such control, FIG. 3 is a schematic diagram of a continuously operating damping control circuit, FIG. 4 is a graph showing variation of transmitted power with phase angle and FIG. 5 is a block schematic diagram of apparatus for providing a stepped form of control.

Referring now to FIG. 1 of the drawings, a transmission system 1 includes apparatus 2 which applies a voltage $V_1$ through a series reactor 3 representing the inherent supply impedance, to the input of a transmission line 4. A shunt reactor 5 is connected to the input of the line 4. The line 4 is effectively composed of distributed series inductance 6 and shunt capacitance elements 7.

The output of the line 4 feeds a substation 8, which, in effect, includes series capacitance 9 and shunt reactors 10 and 11. The substation 8 feeds a second line 12, which may be similar to the line 4, and the output from the line 12 is fed to a second substation 13, which in turn feeds a third line 14.

The line 14 is terminated by a shunt reactor 15 and feeds apparatus 16 via a series reactance 17 which may be a transformer leakage reactance. A phase angle measuring circuit 18 monitors the phase angle $\theta$ between the transmitted voltage $V_1$ and the voltage $V_2$ received by the apparatus 16.

Hence, the power transmitted through the line will increase for a given phase angle $\theta$. These components will therefore have a positive damping effect. In contrast, all longitudinal impedances such as the line reactance 6, any added series reactors, and, in particular, series capacitors 9 etc. will have a tendency to reduce the effective impedance of the line and thereby increase the power with decreasing phase angle $\theta$, thereby causing negative damping in the power transmission system. This effect is particularly strong if a substantial proportion of the line reactance is compensated by series capacitors. An important further contribution of series capacitors in a line is that they increase the natural oscillation frequency of the system, and with it the factor of proportionality between the maximum phase angle reached and the corresponding maximum frequency variation to be expected. Hence, unless the equally amplified damping effect in the generator is prevented from being cancelled by automatic voltage regulation means, series capacitors will clearly aggravate the damping problem.

Hence, the basic transmission system shown in FIG. 1 requires added damping control. This is effected in accordance with the invention by locally controlling the voltage of the transmission line by one or more shunt connected saturated reactors.

A somewhat similar arrangement is shown in FIG. 2 in which corresponding components have the same references as in FIG. 1. In this case, substations 19 and 20 do not include series capacitors, but include shunt capacitors 21 and 22 respectively. Other capacitors 46 and 47 may be connected in series with shunt saturated reactors 23 and 24. Each of said saturated reactors conveniently comprises a group of primary alternating current saturated reactor cores carrying primary windings in shunt with the transmission line and wound as for magnetic frequency multiplication, and having secondary windings arranged in the form of a closed polyphase mesh, and a saturated compensating reactor having a star connected primary winding connected to tapping points on the mesh, the control means being arranged to control the compensating reactor. Such a reactor may, for example, be as described in my U.S. Pat. No. 3,621,376. Thus the effective number of turns of the primary winding of the compensating reactor may be adjustably variable. Alternatively the compensating reactor may have a control winding, and means being provided for supplying the control winding with direct current of adjustable magnitude for effecting the control.

Thus the shunt reactors may be provided by transductors connected in series, in parallel with or embodied within a.c. saturated reactors or in some cases simply by transductors. If the d.c. excitation is increased with decreasing phase angle of the line, thereby reducing the power with the voltage being reduced due to the stronger excitation, a strong damping effect is produced.

The means 18 in FIGS. 1 and 2 for deriving a signal dependent upon the phase angle of the system may be of any convenient form, for example, as described in U.S. Pat. No. 3,611,040 and U.S. Pat. No. 3,668,413.

In the case represented by FIG. 2, however, a particularly simple method of continuous damping control is available. With increasing phase angle, the current increases all along the transmission line, and in any saturated shunt reactor 23 etc. the current will decrease simultaneously and automatically to restore the balance of reactive power. Therefore it will be necessary only to ensure that the d.c. excitation is increased if the rate of change of the line current is negative, or that of the reactor current is positive. This will merely involve rectification of the output of a current transformer (not shown) and deriving a signal from the rate of change of the d.c. current so obtained by simple differentiating means such as a linear reactor (not shown).

The points at which the current of the saturated reactor and the line current are to be monitored may be at very high voltage and expensive current transformers may therefore be necessary. This expense can, however, be avoided by taking advantage of the fundamental features of the treble frequency compensating current in the saturating reactor of the above-mentioned U.S. Pat. No. 3,621,376 to derive a suitable current for the required d.c. control variations. This current is proportional to the current in the primary winding of the reactor.

FIG. 3 shows one phase of a reactor of the above type arranged to provide continuous damping control. In this arrangement, treble frequency current from a main saturated reactor (not shown) passes through a line 25 forming a primary winding of a current transformer 26. The secondary winding 27 of the current transformer feeds a bridge rectifier 28 which provides d.c. excitation for a treble frequency compensating reactor 29 of the kind referred to above. Phase advance control for the reactor 29 is provided by a linear reactor 30 shunted by a diode 31 and connected across the reactor winding 29.

Any action for the purpose of swing damping may be either bi-polar, i.e. responsive to positive and negative rates of change of phase angle with the appropriate sign of control response, or may be single sided as is the case in the arrangement shown in FIG. 3.

The apparatus described above provides continuous damping control, and such control is particularly useful where a tendency for negative damping exists. However, if the normal overall damping is positive, a step switching control may be sufficient to eliminate large swing amplitudes which are caused by line disturbances such as clearing a fault within a short period of time.

Such a control method is known for linear systems, such as that shown in FIG. 1, in which, due to the absence of self-adjusting shunt reactors, high over-voltages may occur during any back-swing after the clearing of a severe fault, particularly if the line is very long. This scheme, however, always involves switching of large reactive power. The following procedure, if applied to the voltage current characteristics of the saturated reactor during the return from the first overswing of line current will, in this case, protect the system against high over-voltages.

Referring to FIG. 4 of the drawings, it will be assumed that the power P varies with phase angle $\theta$, under normal conditions, in accordance with the curve 32. A line 33, parallel with the $\theta$ axis, crosses the curve 32 at a point 34 where $\theta$ equals a steady state value $\theta_o$. The value of $\theta$ max. depends on the type and duration of the fault. If the series capacitors 9 and 13 in FIG. 1 are now short-circuited, or shunt reactors having a short time rating are added, the $P/\theta$ relationship will follow the curve 35 in FIG. 4.

Switching between the curves 32 and 35 is controlled so that the overall relationship follows the curve 32, with decreasing $\theta$, to an "ON" point 36, then switches to the curve 35 along a line 37, follows the curve 35 to an "OFF" point 38 and returns to the curve 32 along a line 39. The relationship then follows the curve 32 through the point 34.

The "ON" and "OFF" points are chosen so that the "equal area criterion" is satisfied with respect to the additional condition that one of the points at which $(d\theta/dt) = 0$ and which are inter-related by this criterion coincides with $\theta = \theta_o$. This requires that the area $b$ plus the area $c$ in FIG. 4 equals the area $a$.

Referring to FIG. 5 of the drawings, a circuit for providing the step switching function includes an initiation signal generator 40 which is responsive to a signal fed via a diode 41 from a current transformer (not shown) monitoring the line current or reactor current.

When the line current suddenly exceeds a certain maximum normal steady state value, or if correspondingly the reactor current minus any boosting shunt capacitor current falls below a corresponding critical value, an initiation signal from the generator 40 leads to the storage of information which will give an indication of the maximum line current (or maximum phase angle $\theta$ max.) that has been reached. The $\theta$ max. indication is stored in a storage device 42. The $\theta_o$ value immediately before the disturbance is stored in a further device 43 where it is retained for a suitable period of time.

An "ON" signal generator 44 then produces an "ON" signal when the decreasing line current, or the increasing reactor current, reaches a predetermined level in relation to the stored maximum value.

When the current in the line or reactor then reaches a predetermined value relative to the stored steady state current (as indicated by the stored $\theta_o$ value in the device 43) an "OFF" signal generator 45 generates the "OFF" signal and also causes resetting of the generator 40 at an instant so chosen that the equal area criterion satisfies the above condition as nearly as possible.

Although certain embodiments of the invention are described above, clearly many alternative embodiments are possible without departing from the scope of the invention, which includes any means or method of stabilizing oscillations in an a.c. power transmission line in which variation of the transmission line characteristics is involved by means of saturated reactors.

I claim:

1. An alternating current power transmission system, including
   A. a transmission line,
   B. an alternating current saturated reactor connected in shunt with the transmission line, and
   C. means controlling the current voltage characteristic of the saturated reactor in a manner giving positive damping of oscillations induced in the system as a result of a disturbance occurring in the system.

2. An alternating current power transmission system including
   A. a transmission line,
   B. a primary alternating current saturated reactor comprising
      a. a group of reactor cores carrying
         i. primary windings connected in shunt with the transmission line and wound as for magnetic frequency multiplication, and
         ii. secondary windings in the form of a closed polyphase mesh,
   C. a saturated compensating reactor having a star connected primary winding connected to tapping points on the mesh, and
   D. means for controlling the compensating reactor in the manner giving positive damping of oscillations induced in the system as a result of a disturbance occurring in the system.

3. An alternating current power transmission system according to claim 2 wherein the compensating reactor has a control winding, and means is provided for supplying the control winding with direct current related to the current in the primary windings of the primary reactor in a sense which gives said positive damping of oscillations induced in the system as a result of a disturbance occurring in the system.

4. An alternating current power transmission system according to claim 2 wherein the compensating reactor has a secondary winding in the form of a closed mesh, and means is provided for varying the effective number of turns of the primary winding of the compensating reactor in response to variations in the current in the primary winding of the primary reactor in a sense which gives said positive damping of oscillations induced in the system as a result of a disturbance occurring in the system.

5. An alternating current power transmission system according to claim 15, in which the compensating reactor is provided by a transductor, and wherein a part of the connection between the star-connected primary winding of the compensating reactor and the closed polyphase mesh of the primary reactor forms the primary winding of a current transformer, which current transformer has a secondary winding connected to feed a bridge rectifier providing d.c. excitation for the transductor.

* * * * *